Aug. 21, 1945.   B. E. SHAW   2,383,088
GUN FIRING SOLENOID
Filed May 11, 1942   2 Sheets-Sheet 1
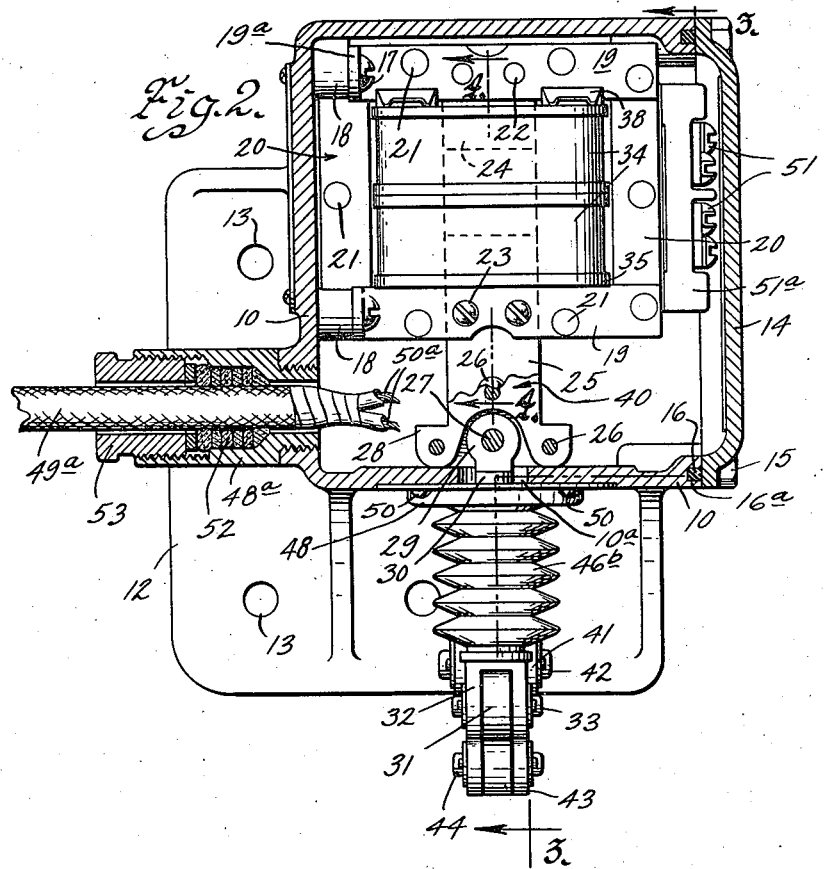
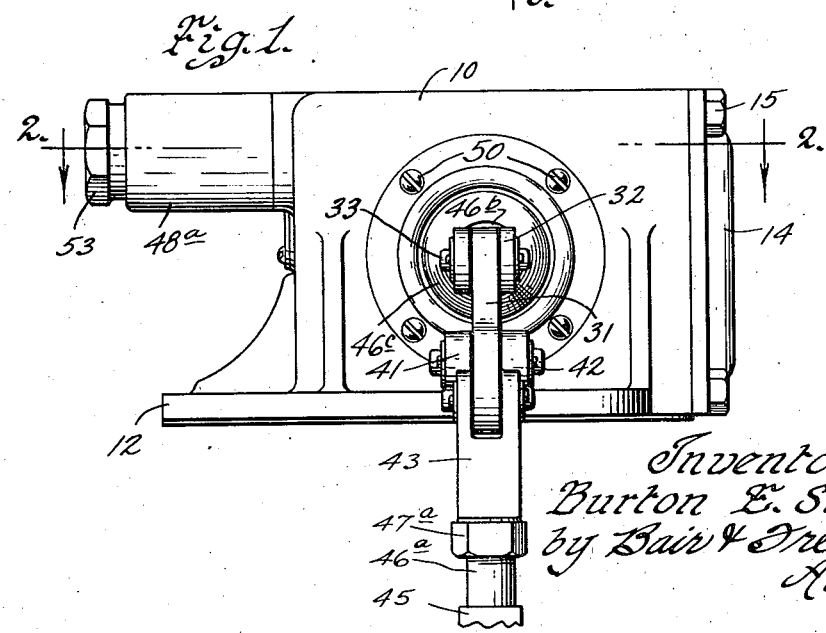
Inventor
Burton E. Shaw
by Bair & Freeman
Attys.

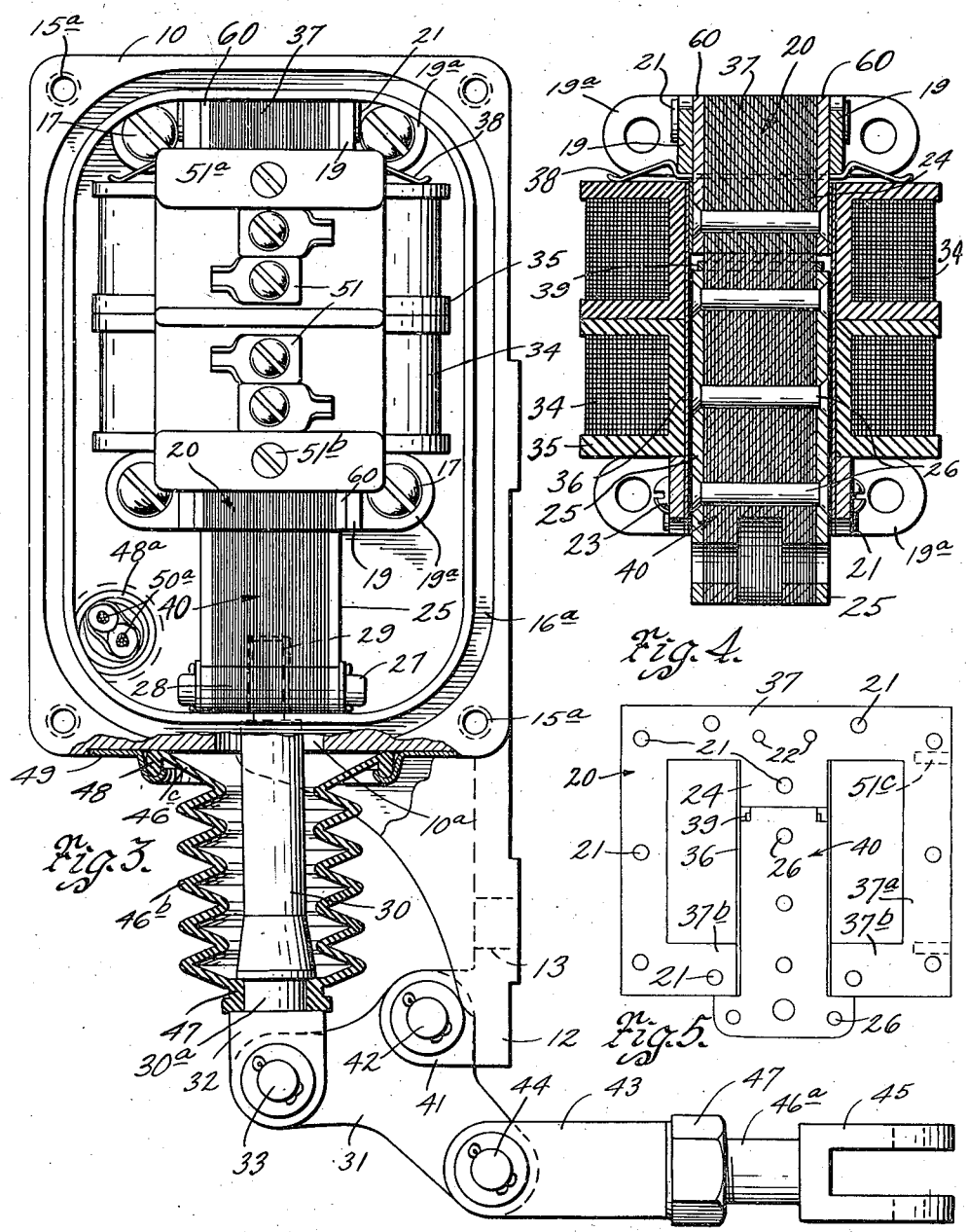

Patented Aug. 21, 1945

2,383,088

UNITED STATES PATENT OFFICE 2,383,088

GUN FIRING SOLENOID

Burton E. Shaw, Bristol, Ind., assignor to Penn Electric Switch Co., Goshen, Ind., a corporation of Iowa Application May 11, 1942, Serial No. 442,458

7 Claims. (Cl. 89—28)

My present invention relates to a solenoid designed for firing large machine guns, particularly where several banks of machine guns, each blank including several machine guns, are to be fired simultaneously and in quick succession from a centrally controlled point.

One object of my invention is to provide a gun firing solenoid so designed as to provide a maximum of power with a minimum of weight.

Another object is to provide a gun firing solenoid which is fool-proof in operation and entirely protected against moisture or water entering the mechanism thereof.

Still a further object is to provide for ready renewal of parts with a minimum of expenditure of time.

Still a further object is to provide a gun firing solenoid which permits the ready changing of a bellows for the actuating stem thereof from the outside of the housing for the solenoid and to provide a convenient arrangement for gaining access to the wiring for making connections thereof to the terminals which are well exposed to view when a water-tight cover plate on the housing is removed.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is an end elevation of a gun firing solenoid embodying my invention;

Figure 2 is a sectional view on the line 2—2 thereof showing the parts within the housing in plan view;

Figure 3 is an enlarged sectional view on the line 3—3 of Figure 2, showing the cover plate of the housing removed and the bellows for the actuating stem in section;

Figure 4 is an enlarged sectional view on the line 4—4 of Figure 2, showing a cross-section through the core, plunger and solenoid coil; and Figure 5 is a diagrammatic view of the solenoid core, plunger and plunger guide tube.

On the accompanying drawings I have used the reference numeral 10 to indicate a housing, and 12 a mounting plate therefor. The housing 10 and its mounting plate 12 may be formed all of one casting with suitable reinforcing ribs, as illustrated, and mounting holes 13 through which bolts or lag screws may be projected into a supporting surface for rigidly mounting the housing with respect thereto. The housing 10 is open at one side, and a cover plate 14 is provided for the open side. The cover plate 14 is secured in position by four cap screws 15 entering threaded openings 15ᵃ in the housing 10. A gasket 16 is located in a routed groove 16ᵃ for sealing the cover plate 14 with respect to the housing 10.

Within the housing 10 I provide a solenoid core 20 which has the shape shown in Figure 5. The core 20 includes a top cross arm 37, side arms 37ᵃ and inward projections 37ᵇ at the lower end which provide a cut-away portion. Opposite the cut-away portion the core 20 extends downwardly in the form of a stop portion 24. A plunger guide tube 36, made of non-ferrous material, surrounds the stop portion 24 and passes down through the cut-away portion of the core between the inward extension 37ᵇ thereof, as best shown in Figure 5.

The solenoid core 20 is made up of a plurality of laminae, preferably thin high silicon steel stock of the proper shape to form a core of the kind illustrated in Figure 5. No attempt has been made to show just where each lamina is cut in order to be stacked into a core of the shape illustrated when the core is built around the solenoid coils 34 and their supporting spools 35 in the usual manner.

The stack of core laminae is provided at each end with relatively heavy end plates 60, as best shown in Figures 3 and 4, which plates are of the same shape as the core 20 (see Figure 5). Two pairs of brackets 19 are mounted on opposite sides of the end plate 60 and have attaching feet 19ᵃ, the brackets being secured to the end plates 60 and the core 20 by a plurality of rivets 21 and 22. The attaching feet 19ᵃ rest on bosses 18 projecting from the wall of the housing 10 opposite the cover plate 14 and are secured thereto by screws 17 threaded into the bosses. The bore 20 is thus rigidly mounted within the housing 10.

The plunger guide tube 36 has slidably mounted therein a plunger 40 consisting of a plurality of laminae covered on opposite sides by end plates 25. The end plates 25 and the laminae 40 are secured together as a unit by five countersunk rivets 26.

The plunger 40 has a pair of stop shoulders 28 between which a socket is formed to receive an eye 29 of an actuating stem 30. A pivot pin 27 extends through the plunger, its socket and the end 29, and is suitably retained in position by cotter pins, whereby it may be removed when necessary for any reason. The actuating stem 30 extends through an opening 10ª in the housing 10, and is provided at its outer end with a yoke or fork 32 pivoted at a pivot pin 33 to a bell crank 31. The bell crank 31 is pivoted on a pin 42 carried by a pair of ears 41 extending from the mounting base 12, and the bell crank lever carries a pivot pin 44 in one of its arms. A fork 43 is pivoted to the pin 44 and a second fork 45 has a shank 46ª threadedly mounted in the fork 43. The shank 46ª may be adjusted in the fork 43, and the adjustment thereafter retained by a lock nut 47.

For sealing the actuating stem 30 with respect to the housing 10 I provide a resilient bellows 46ᵇ formed of rubber or similar material. The bellows 46ᵇ has a constricted end 47 snugly fitted into a groove 30ª of the actuating stem 30. Its other end is flared outwardly, as indicated at 46ᶜ, and terminates in a reinforcing bead 48. The reinforcing bead 48 is retained in compressed condition against an end of the housing 10 covering the opening 10ª therein by a removable flange member 49. Screws 50 extend through the flange member 49 into the housing 10 to retain it in position to compress the bellows bead 48.

A terminal block 51ª is mounted on the core 20 by means of countersunk screws 51ᵇ extending into threaded openings 51ᶜ of the core (see Figures 3 and 5). Terminals 51 for the coils 34 are mounted thereon, the terminals being suitably connected with the coils by means of leads (not shown).

A boss 48ª is screw threadedly mounted in one wall of the housing 10 to receive an armored cable 49ª. The cable 49ª is packed relative to the boss 48ª by means of packing 52 and a packing nut 53. Thus the cable is connected with the housing 10 by means of a water-tight joint. The cable 49ª has leads 50ª which are suitably connected with the terminals 51, which connections have not been shown, as they are conventional and would interfere with the illustration of other parts of the device.

During assembly of the laminae that make up the core 20 the two coils 34 are assembled in their proper position on the plunger guide tube 36 and the lower end of the lower spool 35 rests against the inward extensions 37ᵇ. A pair of retainer springs 38 of the shape shown in Figure 4 are assembled with the coils 34 between the extensions 37ᵇ and the upper leg 37 of the coil. The retainer springs 38 accordingly bias the coils 34 in a downward direction to retain them assembled under spring pressure.

A solenoid of the construction illustrated and described I have found to be extremely powerful for its weight and for the current capacity of the coils 34. The solenoid, accordingly, has a maximum of efficiency, which is a very desirable characteristic from the standpoint of its intended use. The solenoid spools 35 are preferably formed of molded bakelite or a phenolic composition, and the wire for the coils 34 is preferably of enameled type wherein the enamel has a high degree of electrical insulation efficiency. The leads 50ª from the cable 49ª are preferably enclosed in spaghetti tubing where they extend from a linen wrapping at the inner end of the cable 49ª to the terminals 51. All of these features, together with the use of many laminae of thin section and formed of high silicon steel, results in a maximum of pull when the coils 34 are energized, and a minimum of residual magnetism and electrical trouble.

To make the operation of the solenoid as quiet as possible, a shading ring 39 surrounds the plunger 40 adjacent the upper end thereof and is located beyond the side plates 25 of the plunger. The coils, when energized, hold the plunger inwardly until the projections 28 engage the extensions 37ᵇ simultaneously with engagement of the upper end of the plunger with the stop portion 24 of the core, as shown in Figures 4 and 5. When the coils are deenergized, the mechanism for firing the gun which is connected with the fork 45 pulls the parts again to the position of Figures 1, 2 and 3, due to a spring or weight in the gun firing mechanism.

The bellows 46ᵇ is exteriorly mounted with respect to the housing 10 where access can be readily had to it for periodic inspection, as it is important that no fracture be permitted to develop in the bellows. When it is desirable to renew the bellows, the screws 50, the cover plate 14 and the pin 27 may be removed so that the bellows can be taken off the stem 30 and passed up through the opening 10ª. A new bellows may then be quickly substituted. The wiring for the coils 34 is readily accessible by the removal of the single cover plate 14.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a gun firing solenoid, a housing, a removable water-tight cover plate therefor, a solenoid core mounted in said housing, a solenoid coil for said core, a terminal block on said core adjacent said cover plate, a cable receiving boss on said housing, a cable through said boss for connection to said terminal block, packing in said boss to form a water-tight joint between said cable and boss, a plunger slidably mounted in said solenoid coil, an actuating stem pivotally connected with said plunger, said housing having an opening through which said actuating stem extends to the exterior of said housing, a resilient bellows surrounding said actuating stem exterior of said housing and having its outer end sealed to said stem, a retainer flange removably mounted on said housing for sealing the inner end of said bellows to said housing, a bell crank pivoted to said housing, said outer end of said actuating stem being pivoted to one arm of said bell crank, and an operating link pivoted to the other arm of said bell crank.

2. In a gun firing solenoid, a housing, a solenoid core mounted in said housing, a solenoid coil for said core, a terminal block on said core, a cable receiving boss on said housing, a cable through said boss for connection to said terminal block, a plunger slidably mounted in said solenoid core, an actuating stem connected with said plunger, said housing having an opening through which said actuating stem extends to the exterior of said housing, a resilient bellows surrounding said actuating stem exterior of said housing and having its outer end sealed to said stem, a retainer flange removably mounted on said housing for sealing the inner end of said bellows to said housing, a bell crank pivoted to said housing, said outer end of said actuating stem being pivoted to one arm of said bell crank, and an operating link pivoted to the other arm of said bell crank.

3. In a gun firing solenoid, a housing, a solenoid core mounted in said housing, a plunger tube in said core, a solenoid coil in said core, a plunger slidably mounted in said plunger tube, an actuating stem pivotally connected with said plunger, said housing having an opening through which said actuating stem extends to the exterior of said housing, a resilient bellows surrounding said actuating stem and projecting exterior of said housing, said bellows having beads on its outer and inner ends, said stem having a groove receiving the outer bead to seal the bellows to the stem, and a retainer flange removably mounted on said housing and receiving said inner bead of said bellows for sealing the inner end of the bellows to said housing.

4. In a solenoid of the character disclosed, a housing, a solenoid core mounted in said housing, a plunger slidably mounted relative thereto, an actuating stem connected with said plunger, said housing having an opening through which said actuating stem extends to the exterior of said housing, a resilient bellows surrounding said actuating stem exterior of said housing and having its outer end sealed to said stem and its inner end provided with an open base portion having a peripheral bead against said housing, a removable washer-like retainer for said base having an annular groove facing said housing and receiving said bead and operating mechanism connected with the outer end of said actuating stem.

5. In a solenoid structure, a housing, a removable water-tight cover plate therefor, a solenoid coil mounted in said housing, a terminal block in said housing adjacent said cover plate, a cable receiving boss on said housing, a cable through said boss for connection to said terminal block, packing in said boss to form a water-tight joint between said cable and boss, a plunger slidably mounted in said solenoid coil, an actuating stem connected with said plunger, said housing having an opening through which said actuating stem extends to the exterior of said housing, means for sealing said actuating stem relative to said housing, a bell crank pivoted to said housing, said outer end of said actuating stem being pivoted to one arm of said bell crank, and an operating link pivoted to the other arm of said bell crank.

6. A solenoid of the character disclosed comprising a housing, a solenoid core mounted in said housing, a plunger tube therein, a solenoid coil mounted on said plunger tube against one portion of said core, a spring retainer strip interposed between said coil and another portion of said core to keep the coil engaged with said first portion of the core, a plunger slidably mounted in said plunger tube, said core having a stop portion extending into said plunger tube, said plunger having stop shoulders adjacent its outer end for engaging said core simultaneously with the inner end of the plunger engaging said stop portion of said core, a shading ring around the inner end of said plunger, an actuating stem connected with said plunger and extending from said housing, and a resilient bellows surrounding said actuating stem exterior of said housing and having its outer end sealed to said stem and its inner end sealed to said housing.

7. A gun firing solenoid of the class disclosed comprising a housing, a cover plate therefor, a solenoid core mounted in said housing, a plunger guide in said core, a plunger slidable in said plunger guide, said housing having mounting bosses therein opposite said cover plate, end plates for said core having feet attached to said mounting bosses, an actuating stem connected to said plunger, said housing having an opening for said actuating stem to extend to the exterior of said housing, and a resilient bellows surrounding said stem and having one end connected with said housing and its other end connected with said stem in water-tight relation to the housing and stem.

BURTON E. SHAW.